United States Patent
Breher

[11] 3,894,901
[45] July 15, 1975

[54] METHOD OF MAKING HOSES AND PROFILED BELTS IN A CONTINUOUS PROCESS

[75] Inventor: Rudolf Breher, Hausberge, Germany

[73] Assignee: Breco Kunststoffverarbeitungs-GmbH & Co. KG, Germany

[22] Filed: Apr. 9, 1973

[21] Appl. No.: 349,626

[30] Foreign Application Priority Data
Apr. 8, 1972 Germany................ 2216948

[52] U.S. Cl................ 156/143; 138/133; 156/137; 156/173; 156/244; 264/241; 264/271; 264/313; 264/334; 425/35; 425/131
[51] Int. Cl................................. B29d 23/05
[58] Field of Search .......... 156/137, 140, 143, 144, 156/149, 173, 169, 244, 247, 242; 264/334, 241, 261, 271, 313, 328; 425/35, 131, DIG. 130; 138/440, 447, 125, 126, 127, 129, 132, 133

[56] References Cited
UNITED STATES PATENTS

| | | |
|---|---|---|
| 2,730,761 | 1/1956 | Castellan ........................... 156/149 |
| 2,995,176 | 8/1961 | Waugh ............................... 156/143 |
| 3,138,511 | 6/1964 | Cadwallader ..................... 156/143 |
| 3,274,316 | 9/1966 | Songer .............................. 156/144 |
| 3,287,194 | 11/1966 | Waddell, Jr. ...................... 156/143 |
| 3,776,794 | 12/1973 | Ingham ............................. 156/143 |

*Primary Examiner*—Charles E. Van Horn
*Assistant Examiner*—F. Frisenda, Jr.
*Attorney, Agent, or Firm*—Walter Becker

[57] ABSTRACT

Method of and device for making hoses in a continuous process by means of a hollow mold, especially for producing reinforced endless profiled belts of extrudable material with a layer containing reinforcing pull-resistant wires extending in the circumferential direction of the hose being made, according to which a longitudinal support for the reinforcing wire is passed through the hollow mold and while the support is passing through the mold extrudable material is continuously injected into the mold. At the same time the reinforcing wire is wound upon the support in the circumferential direction thereof and the reinforcing wire is embedded in the injected extrudable material. After solidification of the extrudable material and after the hose has left the mold, the support is removed from the hose.

3 Claims, 8 Drawing Figures

METHOD OF MAKING HOSES AND PROFILED BELTS IN A CONTINUOUS PROCESS

The present invention relates to a method of and device for making hoses in a continuous process from material adapted to be extruded while incorporating in the hoses pull-resistant reinforcing inserts extending in the circumferential direction of the hoses. The present invention concerns in particular the making of such hoses from which by cutting up the hoses into individual rings reinforced endless profiled belts are made.

Various methods have become known for producing reinforced profiled belts from extrudable synthetic materials, elastomers, or the like, especially in connection with the production of toothed belts or transmission belts, V-belts, and the like, which have pull-resistant reinforced inserts extending in the longitudinal direction of the belt, while the reinforcing inserts consist in most instances of metallic wires, or of cables or strands composed of such wires. If desired, the pull-resistant reinforcing inserts may be designed in other usable forms and may consist of other suitable materials.

A heretofore known method of making endless reinforced profiled belts consists in winding a reinforcing insert helically around a core, casting synthetic material or the like in a mold around the core, subsequently molding the core and thereafter withdrawing the cast hose from the core. With this method it is difficult to remove the finished hose from the core. As a matter of fact, there exists the danger, when removing the hose from the core, that portions of the hose will back up with the result that deformations of the hose occur. Such deformations are particularly harmful with such hoses from which it is intended to cut off rings to form endless toothed belts inasmuch as the precision and quality of the toothed belts is greatly affected by such deformations. Above all, however, this known method for making reinforced hoses as pre-product for the manufacture of reinforced endless toothed belts or the like represents a discontinuous method and, therefore, is awkward, expensive and uneconomical.

It is, therefore, an object of the present invention to provide a method which will permit in a continuous manner and with high precision and the required dimensions and profiles to produce reinforced hoses, or by cutting the hoses into individual rings to produce endless reinforced profiled belts of high precision.

These and other objects and advantages of the invention will appear more clearly from the following specification in connection with the accompanying drawings, in which.

The method according to the present invention for producing hoses in a continuous manner, especially hoses for making armed endless profiled belts of extrudable material with the reinforcing inserts extending in the circumferential direction of the hoses, is characterized primarily in that a longitudinally extending insert carrier is in a continuous manner passed through a substantially cylindrical mold, and is furthermore characterized in that during the passage of the insert carrier through the mold the extrudable material is continuously injected into the mold while continuously a wire-like reinforcing insert is wound onto the insert carrier and is embedded in the extrudable material. The method according to the present invention is furthermore characterized in that after the extruded material has solidified and the hose has been removed from the mold, the insert carrier is removed from the hose. Advantageously, the insert carrier, when being removed from the hose, is lifted off radially from the inner wall of the hose whereby it will be assured that no deformations of the hose will occur, even if the hose should have a relatively high temperature when being taken from the mold and when the insert carrier is being removed.

A particularly expedient and practical method according to the invention is obtained when as insert carriers several coil or winding supporting wires are distributed over the surface of a stationary mold core and, more specifically, while extending parallel to the longitudinal axis of the mold core and being distributed over the circumference thereof, are pulled through an annular chamber between the mold core and a stationary mold sleeve. These coil supporting wires, for which inexpensive wire material may be employed and which are drawn off from a supply reel, will keep the reinforcing insert wound around the mold core and around the coil supporting wires in spaced relationship to the surface of the mold core and carry the helically wound reinforcing insert through the hollow chamber of the mold so that no friction can occur between the windings of the wound reinforcing insert and the mold core. The distance between the reinforcing insert and the mold core surface may, when producing reinforced toothed belts, be determined in a simple manner by means of the coil supporting wires in such a way that the reinforcing inserts will be located in the neutral zone of the toothed belt. After the finished reinforced hose has been removed from the mold, hose sections of any desired length may be cut off therefrom, and the coil supporting wires can easily be detached from the inside of the cut off hose sections and can be easily pulled out therefrom.

With the coil or winding supporting wires tolerances in thickness may occur which may be reflected in variations of the diameter of the individual windings of the wound reinforcing insert. As a result thereof different lengths of the belt to be produced, for instance a toothed belt, are obtained in practical operation. In order definitely to exclude such effects of the coil carrying wires, particularly when making very small toothed belts of high precision, the method according to the present invention may also be practiced in such a way that as insert carrier a movable rod-shaped mold core is pulled coaxially through a stationary mold sleeve. In this connection, the mold core may be composed of a plurality of sections of any desired length while the respective section which has left the mold is again returned to the inlet side of the mold. These sections are adapted to be coupled to each other in such a way that their longitudinally extending surface profiles are always in precise alignment with each other. These sections may advantageously also be composed of a plurality of elements and may be radially expandable so that the respective mold core sections leaving the mold can without difficulties be lifted off the inside of the hose and can be removed from the hose without the least friction.

Figure 1:
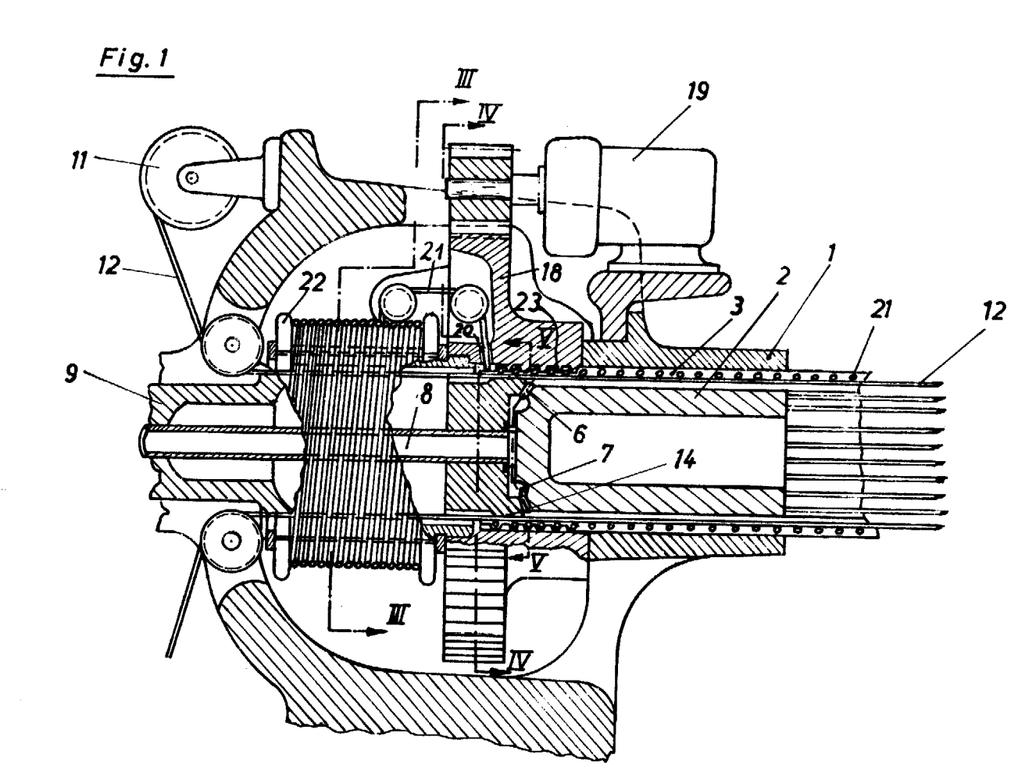
FIG. 1 diagrammatically illustrates a first embodiment of a device according to the present invention, the device of FIG. 1 representing a section taken along the line I — I of FIG. 5.
Figure 3:
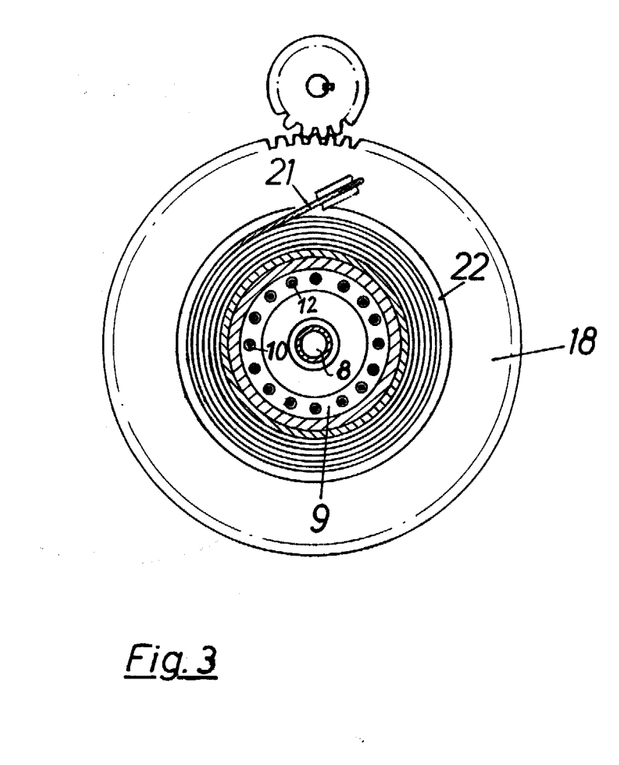
FIG. 3 represents a cross section taken along the line III — III of FIG. 1.
Figure 4:
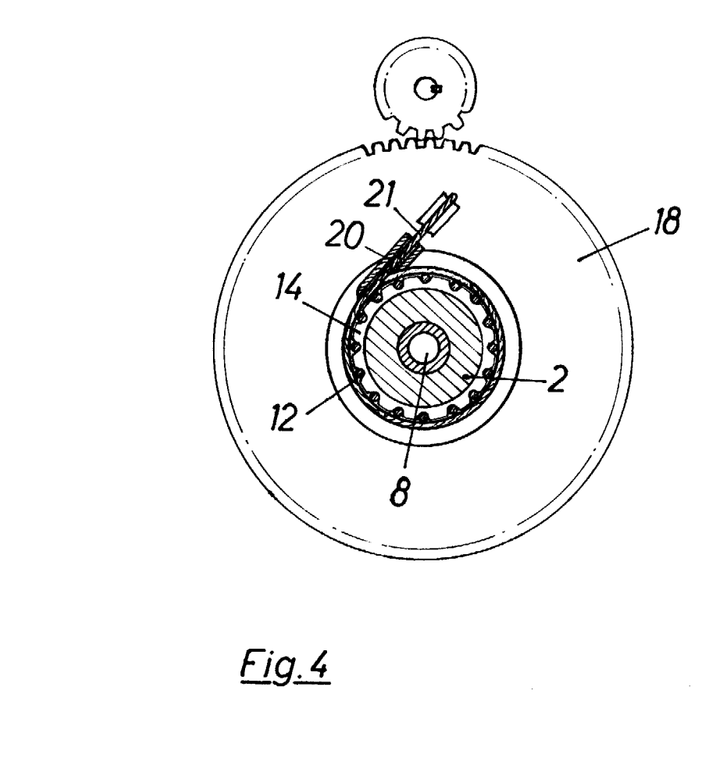
FIG. 4 is a cross section taken along the line IV — IV of FIG. 1.
Figure 5:
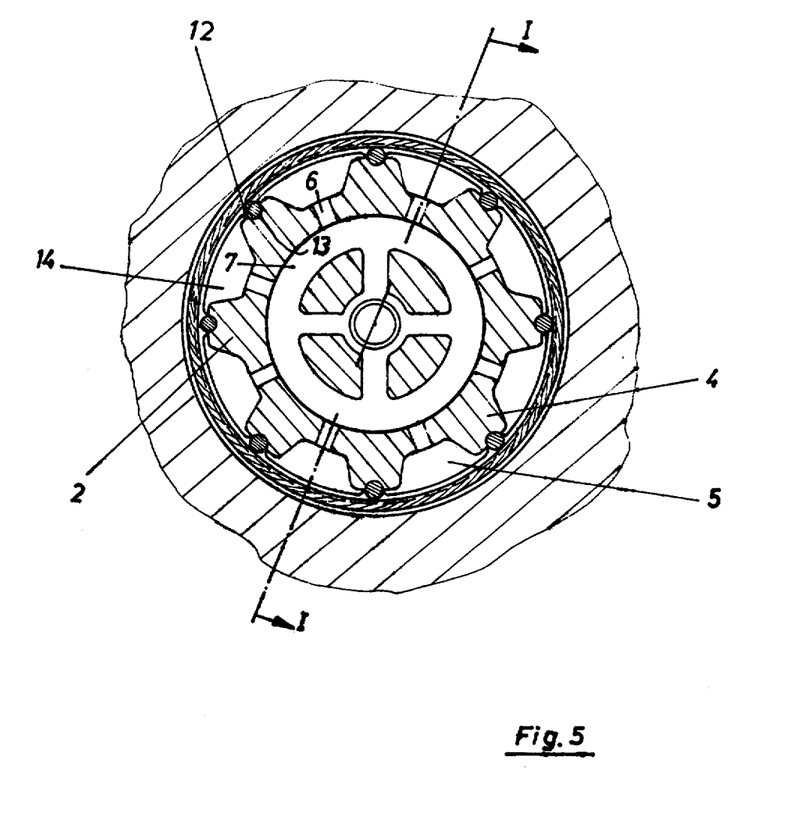
FIG. 5 is a cross section taken along the line V — V of FIG. 1.

Referring now to the drawings in detail, the device illustrated in FIG. 1 comprises a stationary mold sleeve 1 and a stationary core 2 forming with the mold sleeve 1 an annular cylindrical hollow mold chamber 3. As will be seen from FIG. 5, the mold core 2 is equipped with ribs 4 and grooves 5 which extend in the longitudinal direction of the core 2 and which will form the teeth of the toothed belts to be made. At that end of the hollow mold chamber 3 which in FIG. 1 is located on the left-hand side and at which the hollow mold chamber 3 is closed, an injection passage 6 leads into each groove 5. The injection passages or conduits 6 communicate through a distributing ring 7 with a common injection passage or conduit 8 of an extruder. The passage or conduit 8 extends through an extension 9 of the mold core 2, the extension 9 being located on the left-hand side of FIG. 1. The extension 9 of the mold core 2, which extension is located in front of the closed left-hand end of the hollow chamber 3, has inlet passages 10 (FIG. 3) through each of which a coil carrier wire 12, adapted to be withdrawn from a supply drum 11, is introduced into the hollow chamber 3. In the hollow chamber 3 adjacent to the inlet passages 10 there are provided groove-like depressions 13 which are in an axis-parallel manner distributed over the circumference of the mold core 2 and are arranged on the surface thereof and, as shown in FIG. 5, are located on the ridge surfaces of the ribs 4 as far as the mold core 2 is provided with ribs 4 and grooves 5. The wires 12 carrying the coils or windings are pulled through the groove-like depressions 13. The depressions 13 receive the wires 12 in such a way that each wire, during its passage through the hollow chamber 3, protrudes to a certain extent from the surface of the mold core and, more specifically, not only beyond the ridge surfaces of the ribs 4 as shown in FIG. 5 but also projects from the cylindrical surface of that section 14 of the mold core 2 which is located at the closed end of the hollow mold chamber 3 as shown in FIG. 4.

Figure 2:
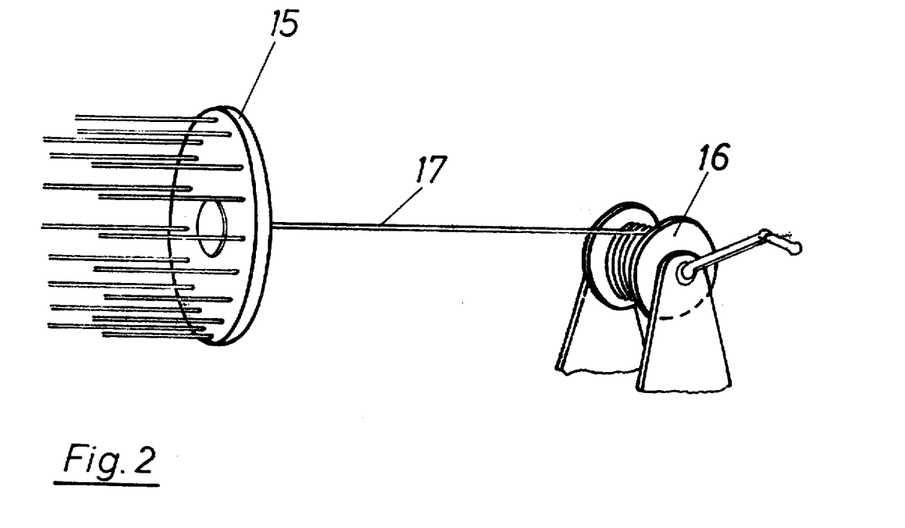
FIG. 2 diagrammatically illustrates a device for use in connection with the arrangement of FIG. 1.

FIG. 2 diagrammatically illustrates a device for pulling the wires 12 through the mold. The wires 12 which exit at the open end of the mold (located at the right-hand side of FIG. 1) have their ends clamped into a chucking device 15 and by means of a reel or winch 16 located at any desired distance from the mold are by a pull cable 17 withdrawn from the supply drum 11 and pulled through the mold.

The mold sleeve 1 has a rotatably journalled mold sleeve part 18 which is rotatable about the mold core 2 and which is designed as a gear and operable by a motor 19. When employing a suitable intermediate transmission, it is possible by means of the motor 19 also to drive the winch or reel shown in FIG. 2 or any other suitable pulling device for the wires 12. The rotatable mold sleeve part 18 has a feeding passage 20 for a wire-like reinforcing insert 21, the passage 20 leading into the hollow mold chamber 3. The reinforcing insert 21 is by rotation of the mold sleeve part 18 wound helically onto the moving wires 12. The reinforcing wire 21 is withdrawn from a supply drum 22 which is rotatably journalled on the extension 9 of the mold core 2. In order to assure that the reinforcing wire 21, when being fed into the hollow mold chamber and when being wound around the wires 12, will always be kept in taut condition, the mold sleeve part 18 rotates in the same direction in which the reinforcing wire 21 has been wound onto the supply drum 22.

Inasmuch as the wires 12, as mentioned above, protrude from the surface of the mold core 2, the reinforcing wire 21 is by means of the wires 12 kept in spaced relationship to the surface of the mold core 2 and is carried through the hollow chamber 3 without frictionally engaging the surface of the mold core 2. By correspondingly dimensioning the wires 12, it is possible to dimension the distance between the wound-up reinforcing wire and the ridge surfaces of the ribs 4 (FIG. 5) in such a way that the reinforcing insert is located in the neutral zone of the toothed belt.

According to the embodiment of the device of the invention as illustrated in FIG. 1, the lead-in or mouth of the feeding passage 20 for the reinforcing wire 21 is located in the hollow chamber 3 of the mold and, when viewing in the direction of advance of the wires 12, is arranged ahead of the mouth of the injection passages 6 for the extrudable material, such as synthetic material. Thus, when viewed in the advancing direction of the wires 12, first the reinforcing wire 21 is wound upon wires 12 and subsequently the synthetic material is injected. With this design of the device, the reinforcing wire 21 may at the same time be used for sealing or tightly closing that end of the hollow chamber 3 which is located at the entrance side. To this end, between the mouth of the injection passages 6 and the mouth of the feeding passages 12 there is provided the cylindrical section 14 of the mold core 2 which section is free from ribs. In the annular cylindrical gap between the surface of this mold core section 14 and the inner surface of the rotating mold sleeve part 18 there are provided a plurality of already coiled windings of the reinforcing wire 21 which in this gap act like a labyrinth seal and thereby sufficiently seal the gap. In the region between the mouths of the feeding passage 20 and the injection passages 6, the rotating mold sleeve part 18 has its inner surface designed as nut 23. The threads of nut 23 are adapted to receive those windings of the reinforcing wire 21 which pass through the region from the mouth of the feeding passage 20 to the mouth of the injection passages 6. The pitch of the thread of nut 23 is selected in conformity with the pitch of the wound reinforcing insert which is determined by the pull-through speed of the wires 12 and the speed of rotation of the mold sleeve part 18. Nut 23 supports the first reinforcing wire windings acting as labyrinth seal in the longitudinal direction of the mold so that these reinforcing wires cannot be pushed together by the pressure of the injected material pressing against the labyrinth seal and thus no undesired and disadvantageous changes in the spacing between the reinforcing wire windings can occur. When viewed in the advancing direction of the wires 12, there exists no necessity behind the mouths of the injection passages 6 to provide a thread on the inner surface of the rotating mold sleeve part 18 because the solidifying extruded material itsel will close the open end of the hollow chamber 3 (located at the right-hand side of FIG. 1) and since the reinforcing wire windings moving over the grooved portions of core 2 are not exposed to any axial displacement forces. The separating gap between the stationary mold sleeve 1 and the rotating mold sleeve part 19 is sealed by a suitable seal.

When the device of FIG. 1 is in operation, first all wires 12 are pushed through the mold to such an extent that their ends exiting from the mold can be chucked in a chucking device 15. By means of the reel or winch 16 illustrated diagrammatically by way of example, the chucking device 15 is pulled away from the device whereby the wires 12 are continuously withdrawn from the supply drum 11 and pulled through the mold 1, 2. At the same time, in view of the rotation of the mold sleeve part 18, the reinforcing wire 21 is withdrawn from its supply drum 22 and introduced into the mold and is continuously wound upon the moving wires 12. Furthermore, at the same time by means of the injection passage system 8, 7, 6 extrudable material, such as synthetic material, is by a non-illustrated extruder continuously injected into the hollow chamber 3 of the mold. The extruded material causes the reinforcing wire windings to become embedded therein and moves with the structure composed of the wires 12 and the reinforcing insert through the hollow chamber 3. During this operation, the extruded material increasingly cools off and solidifies so that at the open end of the mold a reinforced hose will exit having the wires 12 located at its inner circumferential surface. These wires 12 can easily be withdrawn or detached from the inner circumferential surface of the hose or, as the case may be, will drop off therefrom by themselves. As soon as the hose section which has left the mold has reached a certain length, this hose section together with the wires 12 may be cut off shortly behind the device of FIG. 1. The ends of the wires 12 which protrude from the device can again be chucked in the chucking device 15 and can be pulled forwardly in a continuous manner. At the cut-off hose section the cut-off pieces of wire can easily and conveniently be pulled out. It is now possible by cutting off rings from the finished reinforced hose to produce individual toothed belts of any desired width.

Figure 6:
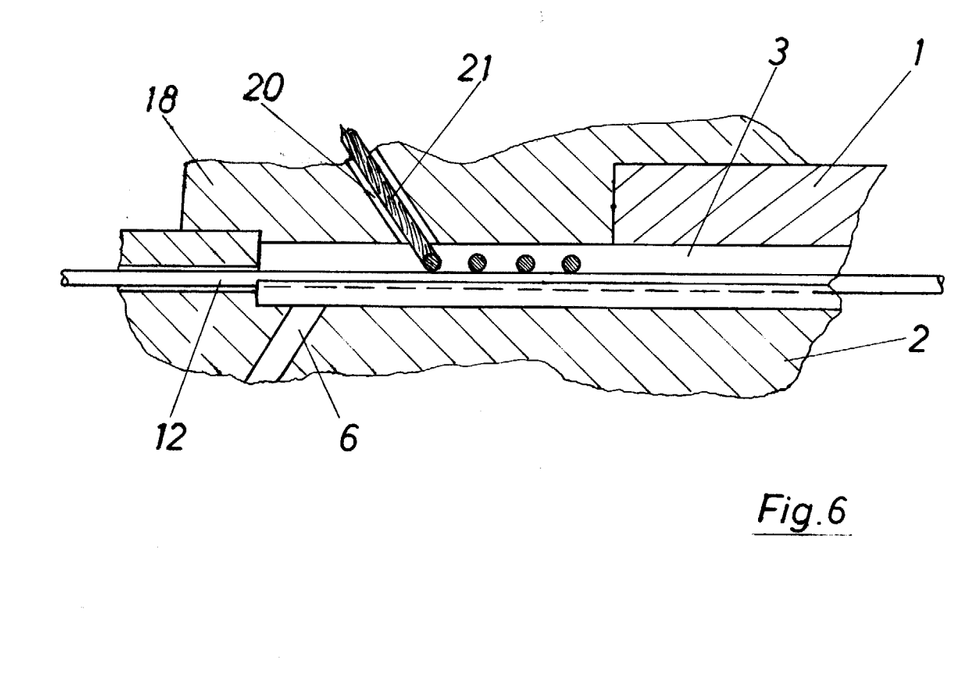
FIG. 6 represents a modification of the device shown in FIG. 1.

FIG. 6 shows a modified design of the device according to FIG. 1. According to this design, the rotating mold sleeve part 18 itself will through the interposition of a suitable seal, cooperate with a sealing shoulder or the like of the mold core 2 in a sealing manner and will also seal the left-hand end of the hollow chamber 3. With the embodiment of FIG. 6, the mouth of the feeding passage 20 for the reinforcing wire 21 is, when viewing in the advancing direction of the wires 12, located behind the mouth of the injection passages 6 in the hollow chamber 3. With this design, it will be appreciated that first the extrudable material is continuously injected into the hollow chamber 3, and subsequently the reinforcing wire 21 is continuously wound onto the wires 12 and thus is continuously wound into the plastic material and embedded therein. This method may be of particular advantage when the extrudable material in plasticized condition is relatively tough. It will be appreciated that in these circumstances on the surface portion of the wires 12 which extends into the hollow chamber 3 a thin layer of already cooled off and hardened material is formed prior to the reinforcing wire being wound into the material and being embedded therein. In this way, between the wires 12 and the reinforcing wire 21, a thin layer of material will form with the result that in the finished hose the the reinforcing wire will be completely enveloped by the hose material and thereby will be properly protected against corrosion.

Figure 7:
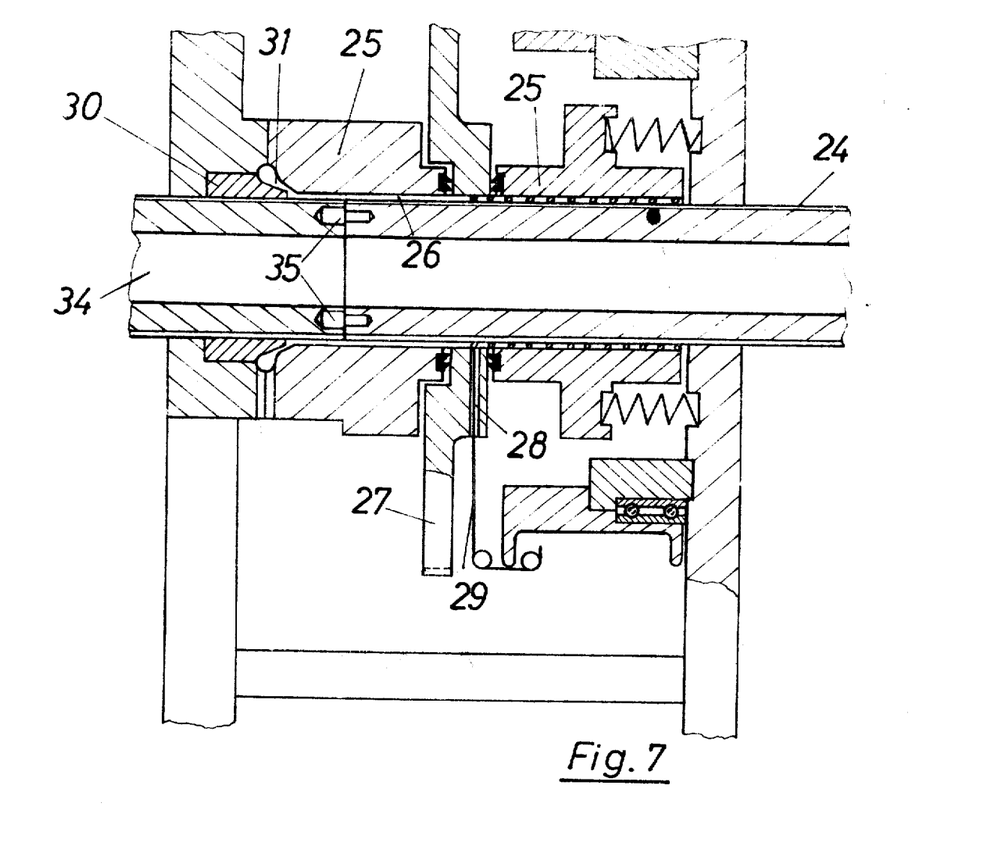
FIG. 7 is a longitudinal section through a further embodiment of a device according to the invention.

FIG. 7 shows a second embodiment of the device according to the invention which is particularly suited for the manufacture of small toothed belts with maximum precision with which a permanent exact circumferential length of all individual reinforcing wire windings is of great importance to make sure that the toothed belts in practical operation will have the precise required belt length. Instead of employing individual wires 12, which on the one hand are inexpensive and economical since the wire material does not have to meet high quality requirements, but with which on the other hand variations in the wire diameter may occur, it is suggested according to device of FIG. 7 that as insert carrier there is provided a movable rod-shaped mold core 24 which is pulled coaxially through the stationary mold sleeve 25 which latter together with that section of the mold core which is surrounded by the sleeve 25 forms an annular cylindrical hollow mold chamber 26. The sleeve 25 again has a motor-driven rotating sleeve part 27 which is provided with a feeding passage 28 for a wire-like reinforcing insert 29. The insert 29 is wound off a supply drum in the above described manner and is wound directly onto the moving mold core 24. Also in this instance it is a matter of course that the advancing speed of the insert carrier or the withdrawal of the finished hose from the device, on the one hand, and the winding-up speed of the rotating mold sleeve part 27, on the other hand, are tuned to each other to maintain the desired pitch of the wound reinforcing insert.

Figure 8:
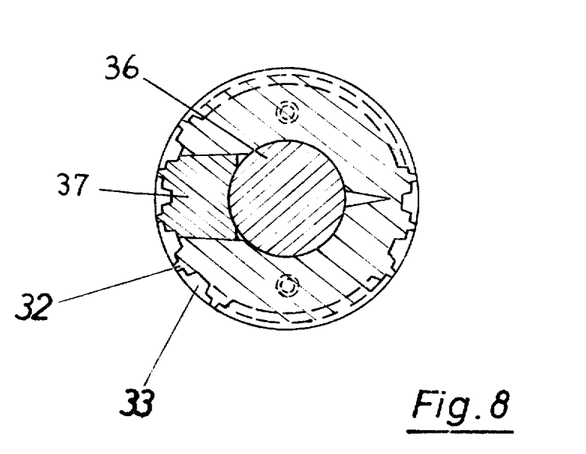
FIG. 8 illustrates a cross section through a detail of the device of FIG. 7.

At its front end the hollow chamber 26 is tightly closed. The mold sleeve 25 has a suitable seal 30 which slides in a sealing manner on the surface of the mold core 24. When the mold core 24, as illustrated in FIG. 8, has a surface which is equipped with ribs 32 and grooves 33 extending in longitudinal direction for forming the teeth and tooth spaces of the toothed belts, it is obvious that also the sealing surface of the seal 30 which cooperates with the mold core 24 is profiled accordingly. At the start of the hollow chamber 26, an injection passage 31 leads into each groove 33 similar to the arrangement of the device of FIG. 1. With the device of FIG. 7, similar to the device of FIG. 6, the process is carried out in such a way that first the extrudable material is injected into the hollow mold chamber and subsequently the reinforcing insert is wound onto the insert carrier while the plastic material is embedded in the extruded plastic material. The device of FIG. 7 may, if desired, also be so modified that, similar to the device of FIG. 1, first the reinforcing insert is wound up and subsequently the material is injected. The rod-shaped mold core 24 is subdivided into a plurality of sections 34 which are adapted to be coupled to each other. The coupling devices 35 arranged at the ends of the individual sections simultaneously bring about that the ribs 32 or grooves 33 of two sections coupled to each other will be in alignment with each other. As soon as one or more sections 34 have left the device, the hose section which has come out is cut off and the mold core sections 34 which have exited are disconnected. The disconnected mold sections are again coupled to the other side of the mold for renewed movement through the device. It is of particular advantage so to design the mold core sections 36 that each individual section 34 can be spread radially. For instance, as indicated in FIG. 8, a core 36 may be provided in the mold section 34. After core 36 has been pulled out of the mold section, a spreading wedge or key 37 is displaced radially inwardly whereby the mantle portion of the mold core section which is provided with a longitudinal slot can contract and decrease in diameter. As a result thereof, the mold core section to be removed from a finished hose piece can first be reduced in size in radial direction and can be lifted off from the inner wall of the hose so that it can be pulled out of the hose piece without any effort.

It is, of course, to be understood that the present invention is, by no means, limited to the specific embodiments of the invention as illustrated in the drawings but also comprises any modifications within the scope of the appended claims.

What I claim is:

1. A method of making hoses in a continuous process by means of a hollow mold, especially for producing reinforced endless profiled belts of extrudable material with a layer containing reinforcing pull-resistant wire means extending in the circumferential direction of the hose being made, which includes the steps of: passing through said hollow mold and in a continuous manner a longitudinal support for reinforcing wire means, while said support is passing through said mold continuously injecting extrudable material into an annular space between said hollow mold and a stationary mold core within said hollow mold and winding reinforcing wire means upon said support in circumferential direction thereof and embedding said reinforcing wire means in the injected extrudable material, following the solidification of said extrudable material and after the hose thus formed has left said mold removing said support from said hose, employing as support a plurality of longitudinally extending wires and arranging the same on and distributing them around the stationary mold core in substantially parallel arrangement to the axis of said core, and pulling said longitudinally extending wires with said wire means thereon through between said mold core and the mold portion surrounding said wire means.

2. A method according to claim 1, which includes the step of employing as support for the reinforcing wire means a movable rod-shaped mold core and pulling the same with the wire means thereon through the mold in axial direction of said mold core.

3. A method of making hoses in a continuous process by means of a hollow mold, especially for producing reinforced endless profiled belts of extrudable material with a layer containing reinforcing pull-resistant wire means extending in the circumferential direction of the hose being made, which includes the steps of: passing through said hollow mold and in a continuous manner a longitudinal support for reinforcing wire means, employing as said support a movable rod with longitudinally extending supporting ribs around the outer surface of said rod and introducing said ribbed rod in a sealing manner into said hollow mold, and while said rod is passing through said hollow mold continuously injecting extrudable material into the annular space between said hollow mold and said rod, said annular space being closed at that end where the rod is introduced into the hollow mold, and also while said rod is passing through said hollow mold introducing reinforcing wire means into said annular space and winding said wire means upon said supporting ribs of said rod and embedding said wire means in the injected extrudable material, and following the solidification of said extrudable material and after said rod together with the solidified material and with the embedded wire means has left said hollow mold removing said rod from the hose thus formed.

* * * * *

UNITED STATES PATENT OFFICE
CERTIFICATE OF CORRECTION

PATENT NO. : 3,894,901
DATED : July 15, 1975
INVENTOR(S) : Rudolf Breher

It is certified that error appears in the above-identified patent and that said Letters Patent are hereby corrected as shown below:

On the cover sheet item [73] should read as shown:

Breco Kunststoffverarbeitungs-GmbH & Co. KG,
Vennebeck, Germany.

Signed and Sealed this

Third Day of August 1976

[SEAL]

Attest:

RUTH C. MASON
*Attesting Officer*

C. MARSHALL DANN
*Commissioner of Patents and Trademarks*